US007236791B2

(12) United States Patent
Chambers et al.

(10) Patent No.: US 7,236,791 B2
(45) Date of Patent: Jun. 26, 2007

(54) RADIO CHANNEL ALLOCATION FOR NATIONAL SECURITY AND EMERGENCY PREPAREDNESS CALLS

(75) Inventors: Michael Dwayne Chambers, Plainfield, IL (US); Renling Lawrence Huang, Naperville, IL (US); Ismael Lopez, Berwyn, IL (US); Rafael Quintero, Crest Hill, IL (US); Douglas Harvey Riley, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/172,659

(22) Filed: Jun. 30, 2005

(65) Prior Publication Data

US 2007/0004421 A1    Jan. 4, 2007

(51) Int. Cl.
*H04Q 7/20* (2006.01)
(52) U.S. Cl. ................. 455/450; 455/404.1; 455/435.3; 455/445
(58) Field of Classification Search ................. 455/453, 455/436, 466, 414.1, 452.2; 370/229–236
See application file for complete search history.

(56) References Cited

U.S. PATENT DOCUMENTS

| 4,670,899 | A | * | 6/1987 | Brody et al. ................. 455/453 |
| 6,233,222 | B1 | * | 5/2001 | Wallentin .................... 370/229 |
| 6,366,780 | B1 | * | 4/2002 | Obhan ........................ 455/453 |
| 2002/0065082 | A1 | * | 5/2002 | Yegani et al. ............... 455/452 |
| 2004/0180677 | A1 | * | 9/2004 | Harris et al. ................ 455/466 |
| 2005/0276256 | A1 | * | 12/2005 | Raitola et al. .............. 370/349 |

* cited by examiner

*Primary Examiner*—Temica Beamer

(57) ABSTRACT

The present invention relates to wireless telephone networks, and more particularly to the allocation of radio channels to calls in CDMA-based systems when their Radio Access Networks (RAN) are congested. A Base Station (BS) receives a call origination from a mobile device. The BS communicates information about the call and about its radio availability to a Mobile Switching Center (MSC). The MSC determines the priority of the call and how the call should be treated by the BS based on the supplied information. The MSC communicates the treatment information and the priority information back to the BS.

When the RAN is congested, high-priority calls are queued. These high-priority calls are served based on allocation specification in which radio channels may be assigned to low-priority calls, which are not queued, while there are still calls in the queue.

15 Claims, 13 Drawing Sheets

WPS Queing at the BODBs

| | | | | | | | | |
|---|---|---|---|---|---|---|---|---|
| H | G | F | E | D | C | B | A | Octet |
| | | | [See Below] | | | | | 1 |
| [Mobile Release Treatment] | | | | | | | | 2 |
| [Mobile Band Class] | | | | | | | | 3 - 4 |

| Octet | Value | Meaning(s) |
|---|---|---|
| 1 | 0 | Public Call |
| | 1 | WPS Call |
| | 2 | Emergency (Public) Call |
| | 3 - 255 | (Not Defined) |
| 2 | [As Today] | Release Treatment |
| 3 - 4 | | Band Class |

*Fig. 12*

RADIO CHANNEL ALLOCATION FOR NATIONAL SECURITY AND EMERGENCY PREPAREDNESS CALLS

FIELD OF INVENTION

The present invention relates to wireless telephone networks and, more particularly, to the allocation of radio channels to priority calls in congested CDMA-based systems.

BACKGROUND OF INVENTION

The Wireless Priority Service (WPS) is a National Security/Emergency Preparedness (NS/EP) program that provides priority cellular network access to authorized individuals. The requirements for this service are set forth in the "Wireless Priority Service (WPS) Industry Requirements for the Full Operating Capability (FOC) for CDMA-Based Systems—Home Location Register (Issue 1.0)," which provides for the queuing of WPS call originations and National Security and Emergency Preparedness (NS/EP) call terminations when a radio channel is not available. In addition, further requirements are set forth in "The Development of Operational Technical and Spectrum Requirements for Meeting Federal, State and Local Public Safety Agency Communication Requirements Through the Year 2010" by the Federal Communications Commission, which addresses the concerns of wireless service providers that a large number of WPS users might congregate in a geographic serving area resulting in an unreasonable level of service denial for public users.

The above requirements document specifies general rules and characteristics of an algorithm, called Hard Public Use Reservation by Departure Allocation (H-PURDA), for allocating priority calls in a WPS system. The requirements documents do not however specify the manner in which the H-PURDA must be implemented.

SUMMARY OF THE INVENTION

In accordance with the present invention, the processing required to implement H-PURDA, or another algorithm for allocating radio channels to priority calls in a radio access network, is distributed across a base station (BS) and a mobile switching center (MSC).

In particular, the BS receives call origination messages from a mobile device, creates a base station origination message comprising congestion state information and call type information, sends the base station origination message to the MSC, receives a first setup message comprising call treatment information from the MSC sent in response to the base station origination message, and processes the call according to the information sent in the first setup message. The base station origination message may further comprise a request for priority information for the wireless call and the first setup message sent by the MSC may comprise the requested information. The calls may be identified as high-priority calls (WPS calls) or low-priority calls (public calls). The high-priority calls are placed on a queue at the BS, but low-priority calls are not placed on the queue. Connections are established for high-priority calls and low-priority calls according to a predefined pattern, so for a certain number of connections established for high-priority calls, there is a certain number of connections established for low-priority calls. In the event when there are no low-priority calls waiting for a radio channel, but a low-priority call should be served next, a high-priority call is served from the queue out of turn. Every time a high-priority call is served out of turn, a counter is incremented. When the value of this counter is greater than 1, and a queued high-priority call should be served next, and there are none queued, a connection for a low-priority call is established. Before establishing a connection for a high-priority call, the BS sends another message to the MSC, and the MSC responds with the second setup message with the call treatment information.

The MSC receives from the BS a base station origination message comprising congestion state information and call type information for the wireless call, determines call treatment information based on the congestion state information and the call type information for the wireless call, creates a first setup message comprising the call treatment information, and sends the first setup message to the base station. The base station origination message may comprise a request for priority information for the wireless call and the first setup message may comprise the requested priority information. The call type information in the origination message identifies the wireless call as a high-priority call or a low-priority call. The MSC allocates memory, called a register for every wireless call when the base station origination message is received. If there are two wireless calls from the same mobile device, the MSC drops one of the calls. The MSC determines whether the wireless call should be processed by the base station as a high-priority call, a low-priority call, or should be denied radio recourses. The MSC also verifies that the dialed number begins with a predefined pattern that identifies a high-priority call origination request, such as '*272', checks in a locally stored subscriber profile whether a subscriber originating the wireless call can originate a high-priority call; and if there is no locally stored subscriber profile, checks in a remotely stored subscriber profile whether the subscriber originating the wireless call can originate a high-priority call. The MSC may suspend the profile verification if the wireless call is an emergency call, e.g., an E911 call.

BRIEF DESCRIPTION OF THE DRAWINGS

The present invention may be understood more fully by reference to the following detailed description of the exemplary embodiments and the appended figures in which:

FIG. 12 illustrates MSC data appended to the MSC_SETUP message in accordance with the present invention.

DETAILED DESCRIPTION OF THE EMBODIMENTS

Figure 1:
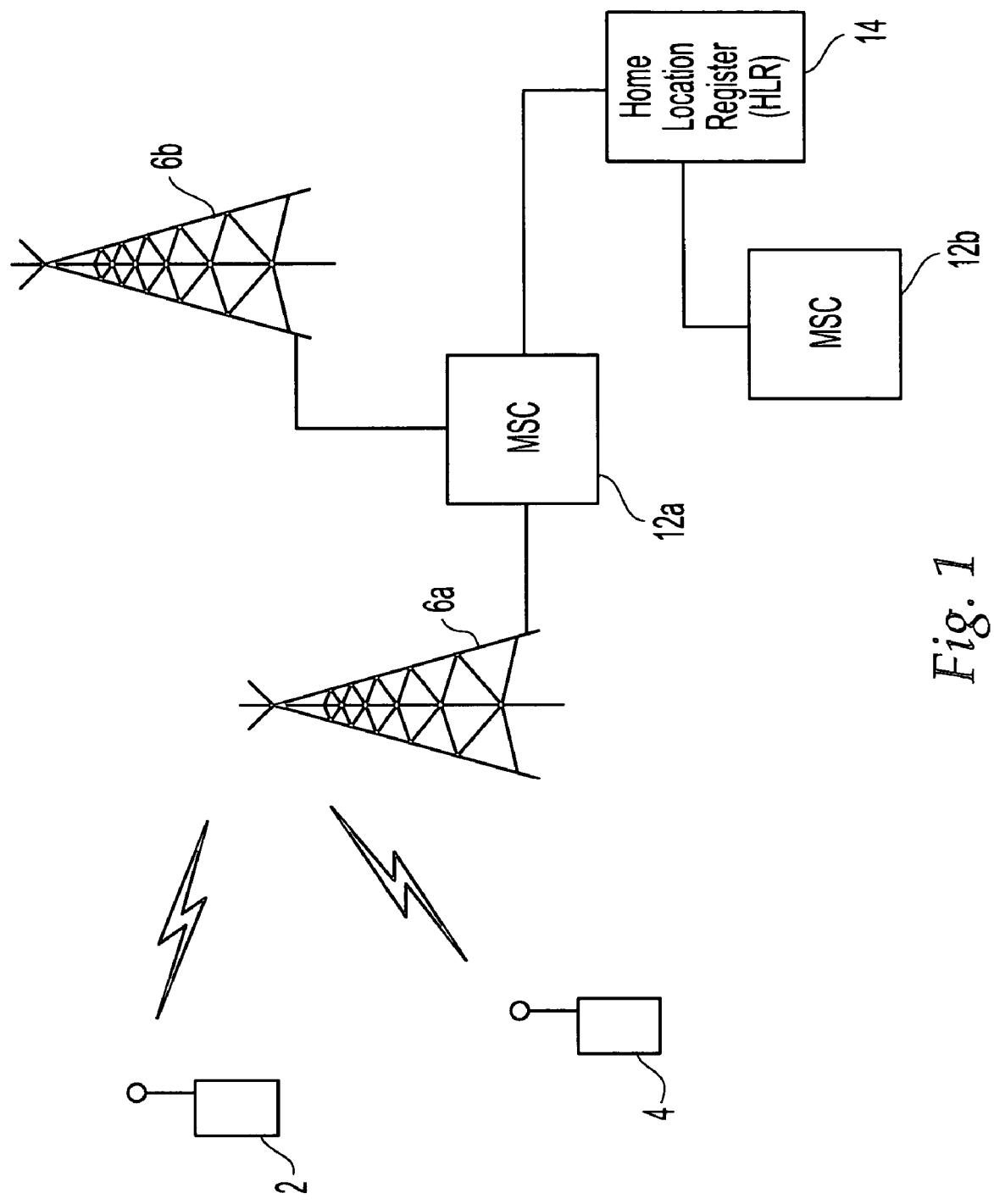
FIG. 1 illustrates a typical wireless network access system.

FIG. 1 illustrates the basic components of a wireless telephone network in accordance with the present invention. Mobile devices 2 are cell phones or other devices (such as PDAs) originating WPS calls. Mobile devices 4 are cell phones or other devices that originate low priority, public calls. The same mobile device may originate either high priority or low priority calls. BS's 6 receive calls from the mobile devices in the radio access network, such as mobile devices 2 and mobile devices 4. The BS's 6 are connected to MSCs 12, which in turn are connected to a Home Location Register (HLR) 14. The HLR 14 is capable of accessing subscriber profiles, which it does upon request from an MSC 12. There may be one or more MSCs 12 connected to an HLR 14, and MSCs 12A and 12B may be connected to different HLRs.

As described in further detail below, a BS 6 receives a call origination message from a mobile device 2 or 4, and, in turn, sends a BS_ORIG message to MSC 12, describing the features of the received call and its status, including the dialed digits which may be used to identify the call's priority and the availability of radio spectrum on the BS 6. The MSC 12 processes the BS_ORIG message and responds to BS 6 with an MSC_SETUP message that includes information on how to process the call. BS 6 then queues the call if instructed to do so in the MSC_SETUP message. When BS 6 later removes the call from the queue, it sends a BS_ORIG_DQ message to MSC 12. In response, MSC 12 sends a second MSC_SETUP message to BS 6, which again includes information on how to process the call.

The radio spectrum for a given BS may be in three congestion states: Red, Yellow, and Green. In the Red state, there are no available radio channels at the BS. In the Yellow state, the available resources are limited and if a call connection is established it may be subject to interference from other calls. In the Green state, there are sufficient radio channels available to establish a connection for a call.

In one embodiment, the BS maintains a queue of the WPS calls in accordance with H-PURDA. In particular, if a call origination message for a WPS call is received by the BS, but the BS is not able to assign a radio channel to it, the call will not be dropped, but instead will be placed in a first-in-first-out queue and processed at a later time. To avoid prolonged blockage of public calls during times of network congestion, for every x WPS calls for which a connection is established, there must be y public calls for which connection is established. In one embodiment, the value of x is 1 and the value of y is 3.

If however there has been x WPS calls, but no public call origination messages received by the BS, a connection may be established for a WPS call out of turn, if there is one in the queue. This is in effect "borrowing" a radio channel for a WPS call from public calls.

If there are no longer any WPS calls on the queue, but there is still a radio channel "borrowed" from public calls, then the channel is "returned" to public calls.

As used below, a Busy Period is a period when there is either (1) at least one WPS call in the queue, or (2) there are no WPS calls in the queue, but there are radio channels "borrowed," and not yet "returned." N is a variable, maintained by the BS which indicates the current allocation state. If N is greater than 0, then there is currently a Busy Period. If N is 1, then a connection should be established for a WPS call. If N is greater than 1, then a connection should be established for a public call. If N is 0 then there is not currently a Busy Period. N is incremented by 1 each time the BS serves a call in the busy period. When N reaches a predefined maximum value it is set to 1.

Figure 2:
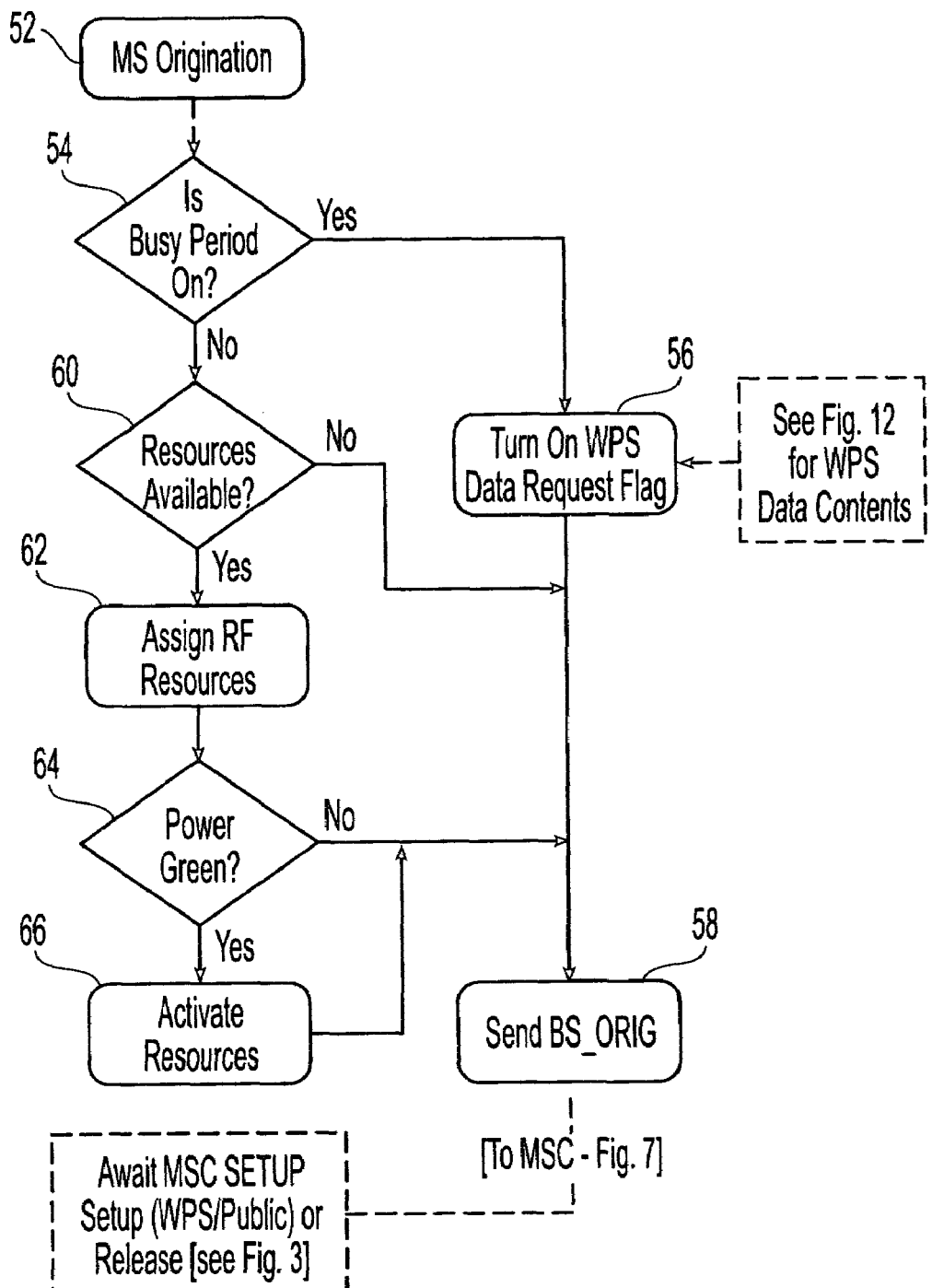
FIGS. 2–6 illustrate the process performed by the BS in allocating priority calls in accordance with the present invention.

FIG. 2 illustrates steps which the BS executes when a call origination message is received. In step 52, the BS receives a call origination message from a mobile device and creates a BS_ORIG message which comprises subscriber identification, type of call, and other information. In step 54, the BS determines whether it is in a Busy Period by checking the value of N. If it is in a Busy Period, then WPS Data Request flag is set to '1' in the BS_ORIG message in step 56. Then, in step 58, the BS_ORIG message is sent to the MSC. If in step 54 the BS determines that it is not in a Busy Period, then the BS checks whether there is a radio channel available in step 60. If there is no radio channel available, step 58 is performed. If there is a radio channel available, then it is assigned to the call in step 62. Then, in step 64, the BS determines whether it is presently in the Green state. If the BS is in the Green state, then the radio channel, assigned to the call in step 64, is activated in step 66, and then step 58 is performed. If the BS is not in the Green state, then the BS performs step 58 immediately following step 64. The BS_ORIG message comprises congestion state information, type of call, subscriber's identification, and information whether a radio channel has been allocated or assigned to the call.

Figure 7:
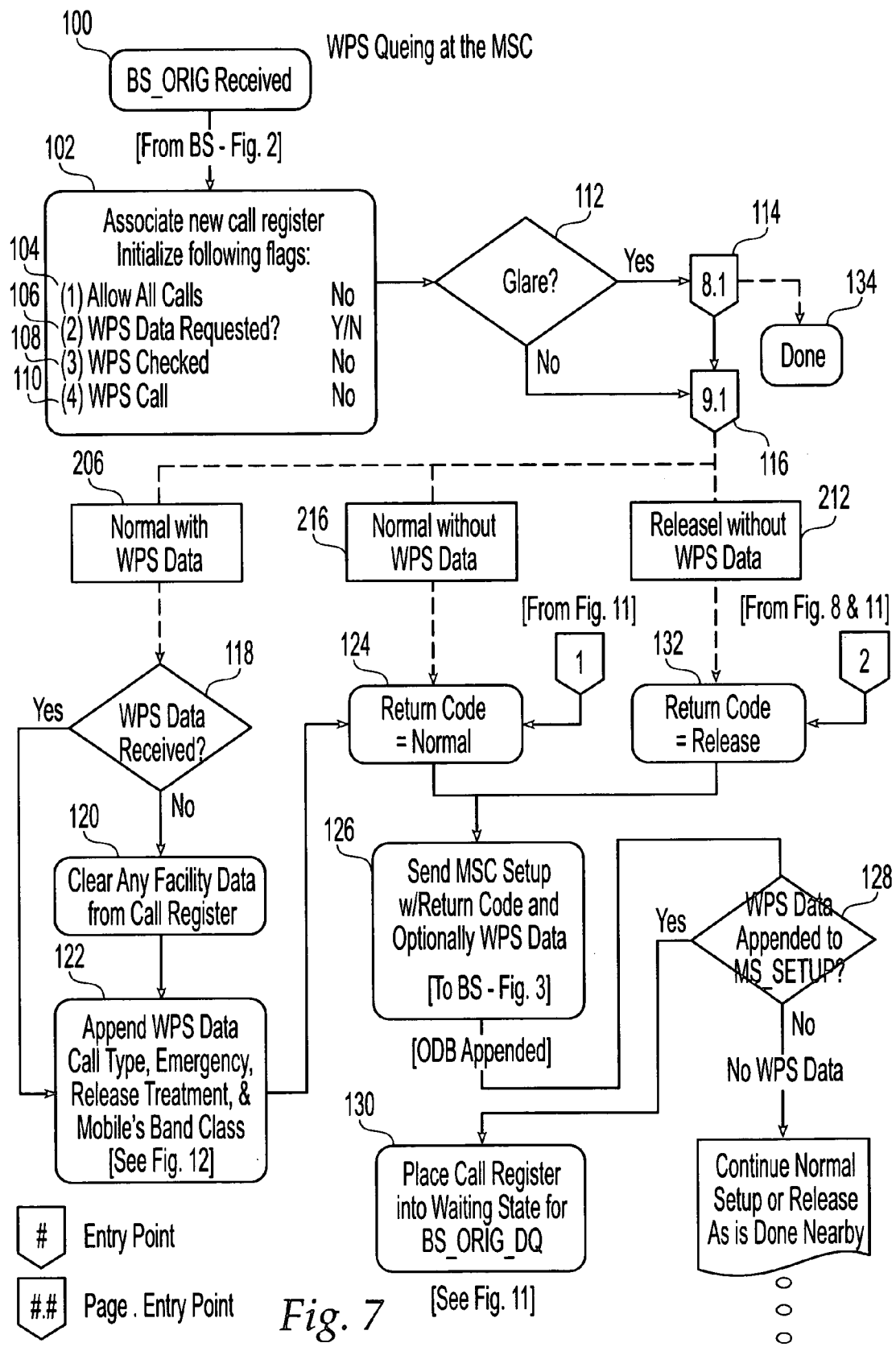
FIGS. 7–11 illustrate the process performed by the MSC in allocating priority calls in accordance with the present invention.

After the message is formed in step 52 and sent by the BS in step 58, it is received by the MSC, as illustrated in step 100 in FIG. 7. A call register 102 is then allocated in memory for that call. In one embodiment, this register comprises four Boolean flags: (1) the Allow All Calls flag 104 is set when the call is an emergency call and the subscriber validation is cancelled, as described below, (2) the WPS Data Requested flag 106 indicates whether WPS data has been requested in the received BS_ORIG message, (3) the WPS Checked flag 108 indicates whether the MSC has checked if the call is a WPS call or not, and (4) the WPS Call flag 110 is set to 1 when the MSC verifies that the call is in fact a WPS call.

In step 112, the MSC checks for glare. Glare occurs when a mobile device has attempted to establish a call, but is disconnected before the connection is established. In this situation the mobile device determines that the call has failed. The RAN, however, may not drop the call and may continue processing it as if the mobile device had never lost the signal. The mobile device however may again attempt to establish the call, with the result that two calls with similar characteristics from the same mobile device may be processed by the same MSC. If in step 112, the MSC determines that there is no glare, then it proceeds to step 116, in which it performs the steps in FIG. 9. Otherwise, if in step 112, the MSC determines that there is glare, it proceeds to step 114, in which it performs the steps in FIG. 8, followed by step 116. In step 114, the MSC determines which of the two calls associated with the glare condition should be dropped. If the MSC determines that the presently processed call should be dropped then its further processing is terminated, which is shown in the step 134.

Figure 8:
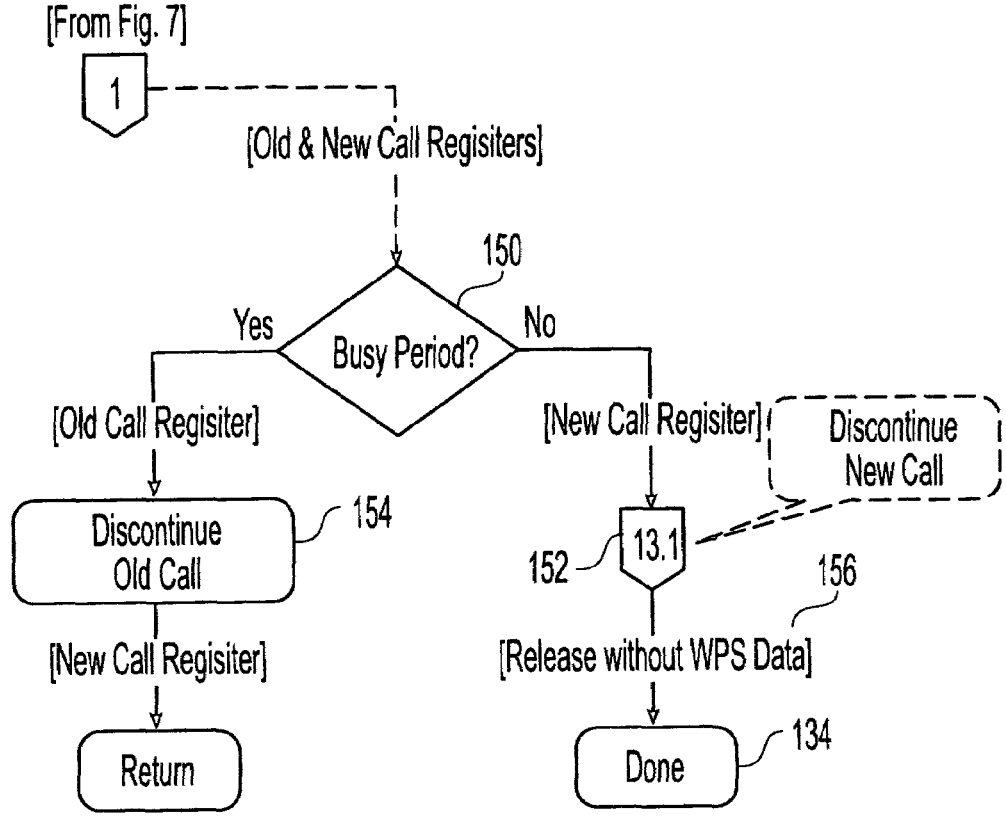
Figure 13:
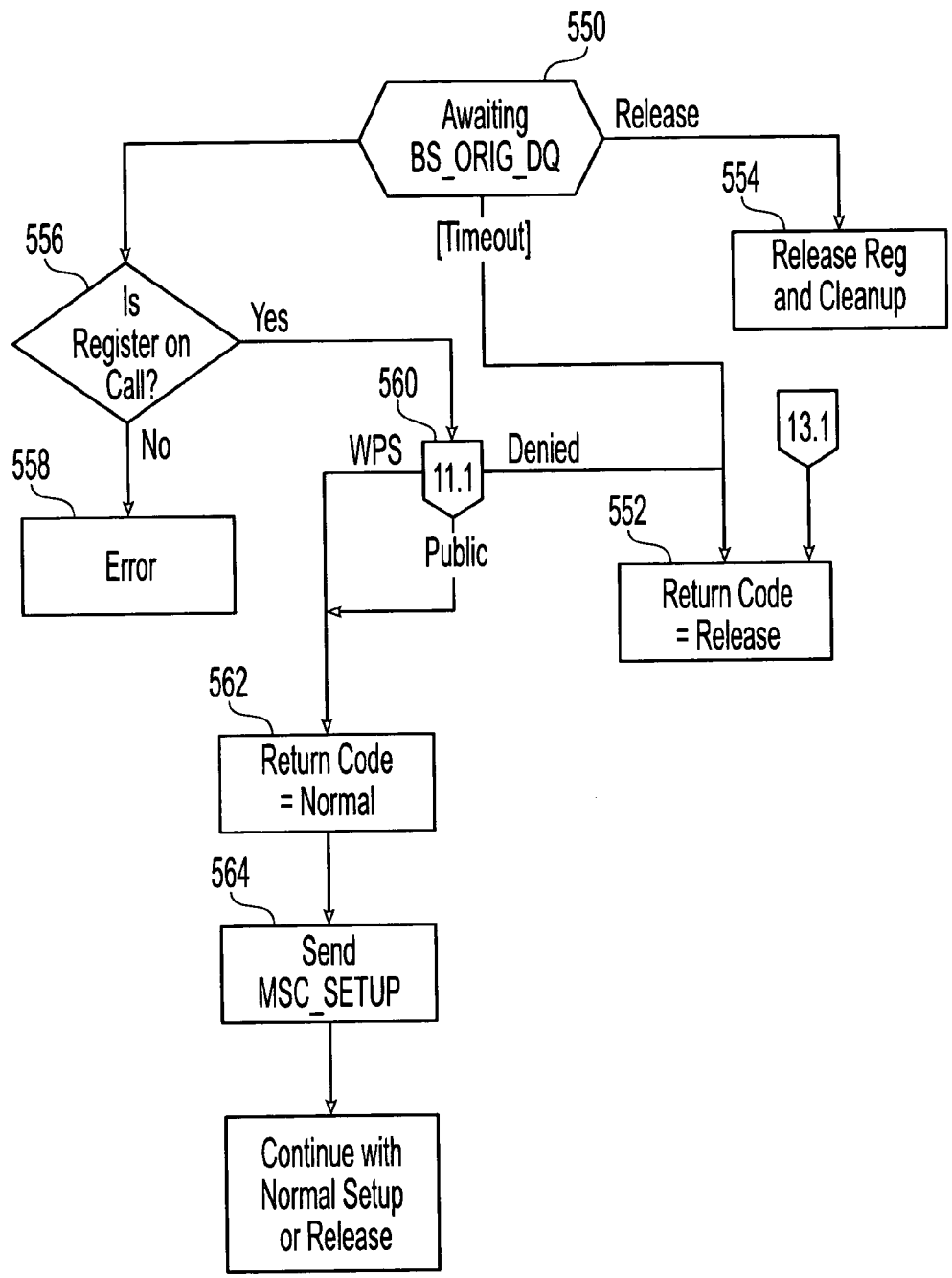
FIG. 13 further illustrates the process performed by the MSC in allocating priority calls in accordance with the present invention.

In FIG. 8, the MSC determines which call, out of the calls from the same mobile device, to drop if there is glare. The MSC will have two registers associated with the "old" and the "new" calls from the same mobile device. In step 150, the MSC determines whether the "old" call is a WPS call by examining the content of the register. If the "old" call is not a WPS call, then the "new" call is discontinued, and its processing terminates in step 152, as shown in FIG. 13. If the old call is a WPS call, then the old call is discontinued in step 154, as required by the Radio Capacity for the Public (RCAP) requirements, and the processing of the "new" call continues in accordance with the present specification.

Returning to step 114 in FIG. 7. If the call is dropped in step 152 in FIG. 8, then the processing is terminated in step 134. If the call is not dropped, or it is determined that there is no glare in step 112, then step 116 is performed, which represents the steps of FIG. 9.

Figure 9:
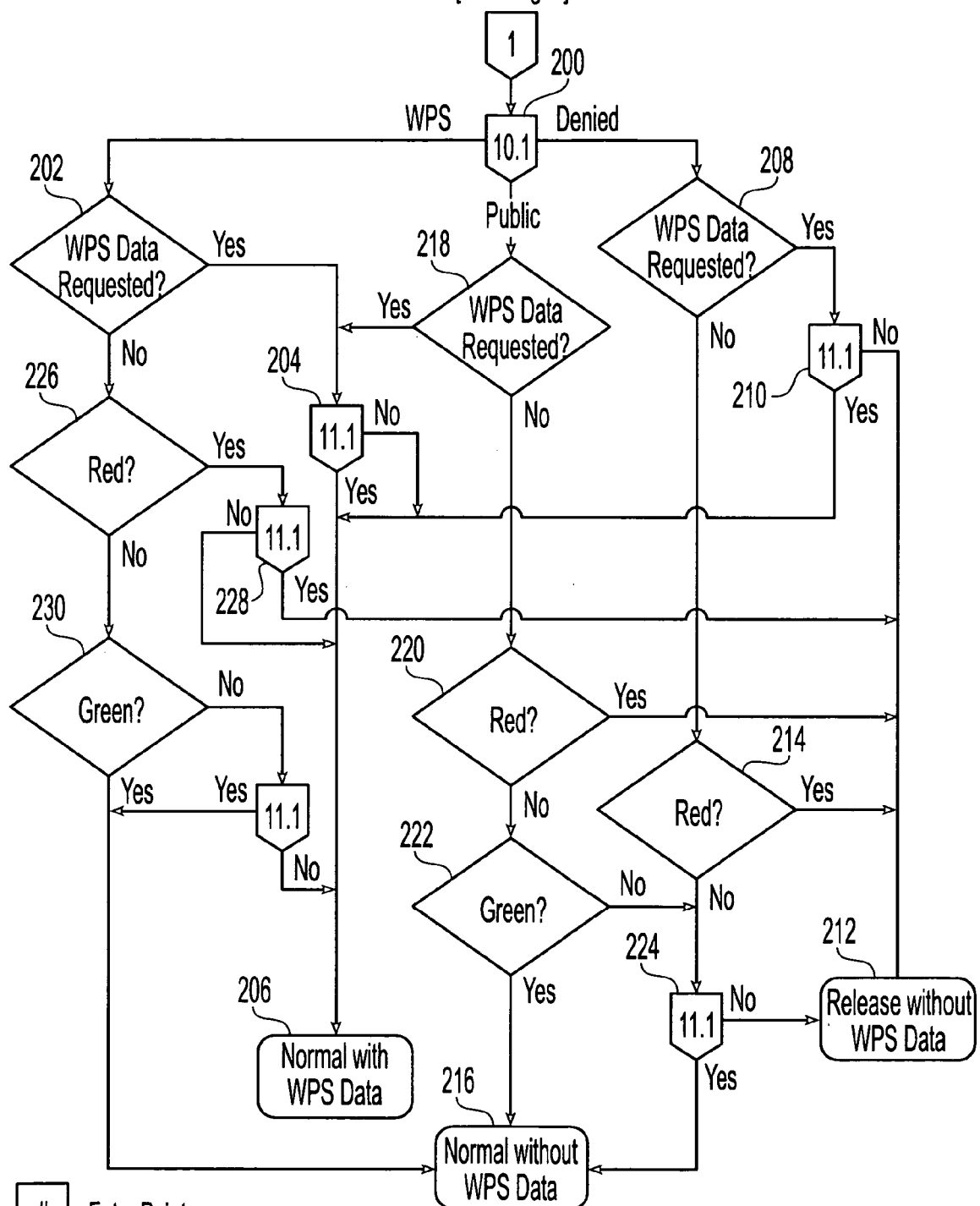

In FIG. 9, the MSC determines how the call should be processed by the BS. There are three options: (1) Normal with WPS data, meaning that the call will be processed normally and WPS data will be provided to the BS by the MSC; (2) Normal without WPS data, meaning that the call will be processed normally, but WPS data will not be provided to the BS by the MSC; and (3) Release without WPS data, meaning that the call should be released by the BS and that WPS data will not be provided to the BS by the MSC.

Figure 10:
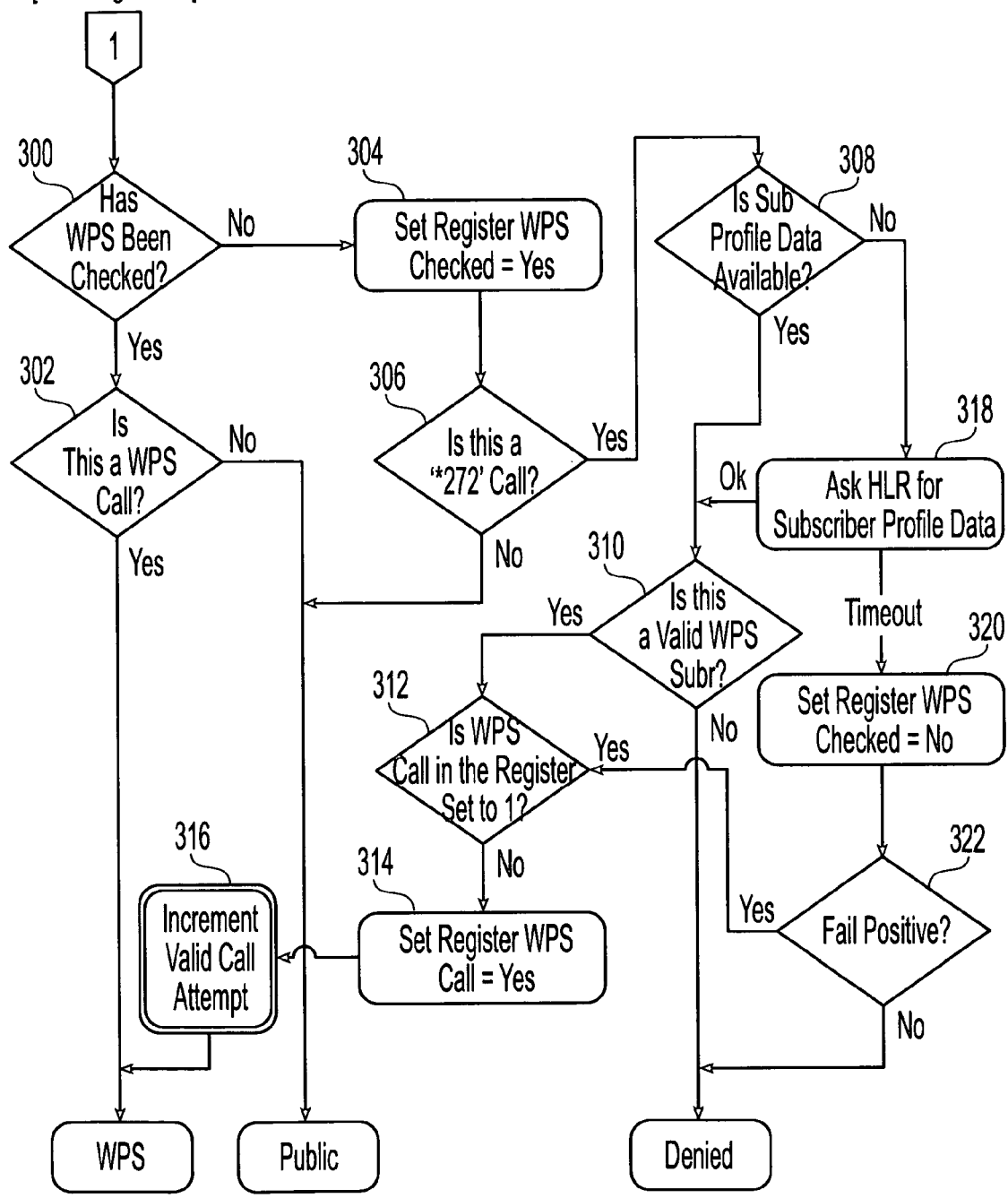

In step 200, the MSC determines whether the call is a WPS call, a Public call or should be denied, typically because the subscriber attempting a WPS call cannot be verified. (For some call types and facility states, the call me be served even though it failed WPS validation.) Step 200 is a multi-step process, as illustrated in FIG. 10. In step 300 in FIG. 10, the MSC verifies whether a digit analysis to detect a WPS call (e.g. detecting *272 as the prefix for the dialed number in an exemplary embodiment) has been performed. During the initial pass through the steps in FIG. 10, this analysis will not have been performed, but classification of the call may be done more than once during the processing of the call and in subsequent passes, the digit analysis may have been performed before step 300. If it has, then the MSC determines if this call is a WPS call in step 302, and if it does, then the MSC concludes that the call is a WPS call. If in step 302, the MSC determines that the call is not a WPS call, then the MSC concludes that this call is a Public call. If in step 300, the MSC determines that the digit analysis has not been performed, the MSC sets the WPS Checked flag to the value of 1 (yes) in step 304. Then, in step 306 the MSC performs the digit analysis by checking whether the dialed digits begin with a predetermined set of digits (e.g. '*272' in the exemplary embodiment). If they do not, then the MSC concludes that the call is a Public call. In other embodiments, the digit analysis may be more complex and involve several operations. If in step 306, the MSC determines that the dialed digits begin with a predetermined set of digits (e.g. '*272' in the exemplary embodiment), then the MSC checks whether the subscriber profile data for the mobile device is available in step 308. The mobile device identification is included in the BS_ORIG message and is available to the MSC to perform the profile check. If the subscriber profile data is available, then in step 310, the MSC determines if the subscriber is a valid WPS subscriber. If the subscriber is valid, then in step 312, the MSC checks whether the WPS Call flag is set to '1' for this call. If in step 312, the MSC determines that the WPS Call flag is set to 0, the MSC sets the flag to 1 in step 314 and then increments "Valid WPS Call Attempt" variable stored at MSC for statistic keeping purposes in step 316 and concludes that the call is a WPS call. If in step 312, the MSC determines that the WPS Call flag has the value of 1, then the MSC concludes that the call is a WPS call, and that changes to the appropriate flags and variables have been made previously and, thus, bypasses steps 314 and 316.

Next, the MSC establishes which out of three processing options should apply to the call. This depends on three criteria: (1) whether the subscriber profile validation is cancelled, which typically occurs when the call is an emergency call; (2) the congestion state of the BS, conveyed to the MSC in the BS_ORIG message, and (3) whether the WPS data has been requested by the BS in the BS_ORIG message.

If, in step 308, the subscriber profile data is not available, the MSC requests, in step 318, subscriber profile data from the HLR. If the HLR returns the subscriber profile within a preconfigured timeout period, the MSC proceeds to step 310. Otherwise, if the MSC is not able to access the subscriber profile data, the MSC sets the WPS Checked flag to 0 in step 320. Then, in step 322, the MSC determines whether it is configured to assume by default that the call is a WPS call. If it is, then the MSC proceeds to step 312. Otherwise the MSC concludes that the call should be denied.

Turning back to step 200 in FIG. 9, if the call is a Denied call, then the MSC proceeds to step 208, where it determines whether WPS data has been requested by examining the WPS Data Requested flag in the register associated with the call. If the WPS Data Requested flag is set to 1, then step 210, corresponding to the sequence of steps in FIG. 11, is executed.

Figure 11:
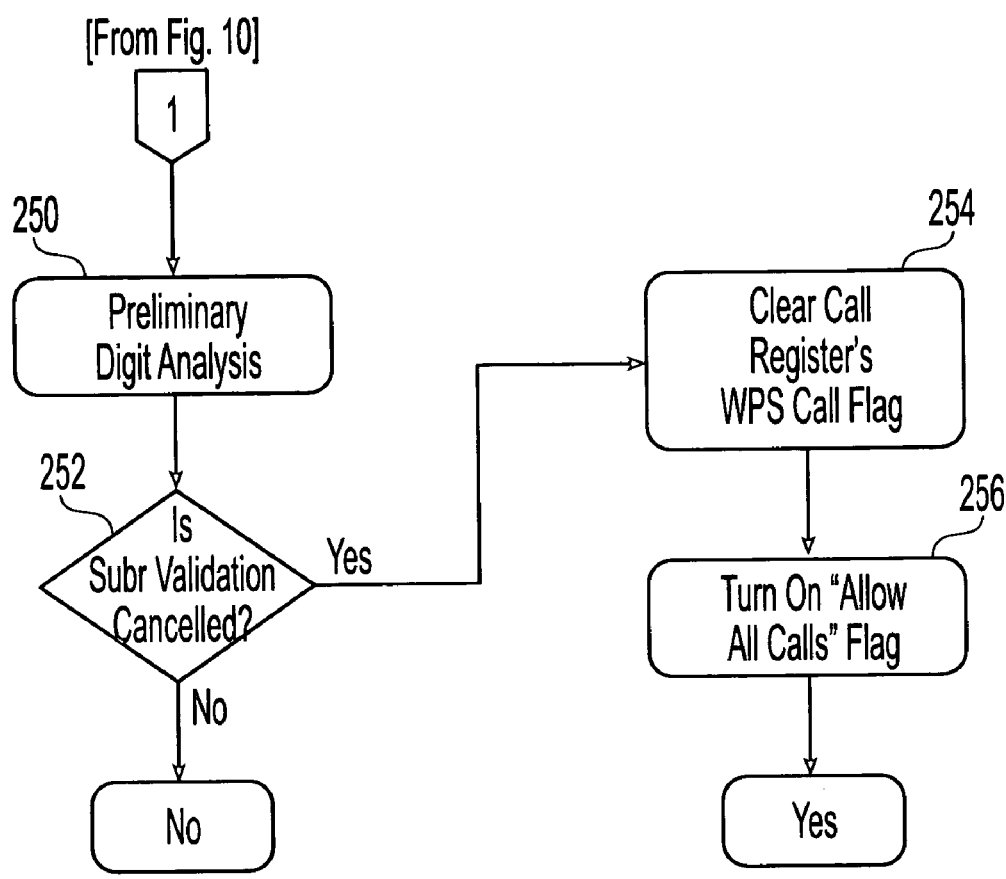

The sequence of steps in FIG. 11, which is repeated several times over the course of the call processing, determines whether to cancel the process of validating the subscriber. In step 250, the MSC performs a preliminary digit analysis of the number that was dialed by the subscriber operating the mobile device. In step 252, the MSC checks whether the subscriber validation process is cancelled. In particular, for certain types of numbers, such as '911,' there is no validation required. If validation is cancelled, the MSC clears all WPS-related flags by setting them to 0 in step 254. In step 256, the MSC sets the Allow All Calls flag in the register of the call to 1 and a "Yes" value is returned. If in step 252, the MSC determines that the subscribers validation has not been cancelled, then a "No" value is returned.

Turning back to step 210 in FIG. 9, if the subscriber validation is cancelled, then the MSC instructs the BS to perform normal processing of the call and sends the WPS data to the BS in step 206. If the subscriber validation is not cancelled, then, in step 212, the MSC will instructs the BS to release the call and does not send WPS data.

If, in step 208, the MSC has determined that the BS has not requested WPS data, which would happen if the Busy period is not on, then it proceeds to step 214, in which it establishes whether the congestion state of the BS is Red. If it is Red, then the MSC proceeds to step 212, in which it instructs the BS to release (drop) the call and does not send the WPS data. If the state of the BS is not Red, then the MSC determines whether subscriber validation is cancelled by executing the sequence of steps in FIG. 11 in step 224. If the subscriber validation is not cancelled, then the MSC performs step 212. If the subscriber validation is cancelled, then step 216 is performed, in which the MSC instructs the BS to perform the normal processing of the call, and does not send the WPS data to the BS.

If it is determined in step 200 that the call is Public, then the MSC performs step 218. In step 218, the MSC determines whether the BS has requested the WPS data. If the BS has requested the WPS data, then step 204 is performed, in which the MSC checks whether subscription validation is cancelled by executing the sequence of steps in FIG. 11. Regardless of whether subscriber validation is cancelled, in step 206, the MSC determines that the call should be processed normally and that the MSC_SETUP message sent to the BS in the response to the BS_ORIG should include WPS data. If in step 218, the MSC determines that WPS data has not been requested, then, in step 220, the MSC determines whether the state of the BS is Red. If the state is Red, then step 212 is performed. If the state is not Red, then, in step 222, the MSC determines if the state is Green. If the state is Green, then the MSC performs step 216. If the state is not Green, then, in step 224, the MSC determines whether the subscriber validation process is cancelled, by executing the sequence of steps in FIG. 11. Then either step 212 or 216, described above, is performed depending on the outcome of step 224.

If in step 200, the MSC determines that the call is a WPS call, then the MSC checks whether the WPS data has been requested by the BS in step 202. If the WPS data has been requested, then the MSC performs step 204 next, followed by step 216. If in step 202 the MSC determines that WPS data has not been requested by the BS, then, in step 226, it determines whether the BS congestion state is Red. If it is, then the MSC determines if the subscriber validation process is cancelled by executing the sequence of steps in FIG. 11, in step 228. If the subscriber profile validation process is cancelled, then the MSC performs step 212; otherwise it performs step 206.

If in step 226, the MSC determines that the state is not Red, then it proceeds to step 230 in which it determines whether the state is Green. If the MSC determines that the state is Green in step 230, then it performs step 216. If the MSC determines that the state is not Green in step 230, then, in step 232, it determines if the subscriber validation process is cancelled by executing the sequence of steps in FIG. 11. If the subscriber validation process is cancelled, then the MSC performs step 216, and if it is not cancelled, then it performs step 206.

Turning to step 116 in FIG. 7, the MSC has determined how the call should be handled. Steps 206, 216, and 212 correspond to steps 206, 216, and 212 in FIG. 9, respectively. In step 206, following the determination that the call should be processed normally and that the WPS data should be included in the MSC_SETUP message, the MSC checks, in step 118, whether the WPS data has been requested. If the MSC determines that the WPS data has not been requested by the BS for this call, then, in step 120, it clears all data from the call register associated with the call. Then, in step 122, the MSC appends WPS data shown in FIG. 12 to the MSC_SETUP message. In FIG. 12, octet 1 contains information regarding the type of the call, in particular, whether it is a public call, WPS call, or Emergency (Public) call.

Turning back to FIG. 7, in step 124, the return code in the MSC_SETUP message is set to the value corresponding to the code of "Normal." In step 126, the MSC sends the MSC_SETUP message to the BS. In step 128, the MSC determines whether WPS data has been appended to the MSC_SETUP message. If so, in step 130, it places the call register into a waiting state, until a BS_ORIG_DQ message for the call is received from the BS. If in step 128 the MSC determines that WPS data has not been appended to the MSC_SETUP message, which occurs if the BS is not in the Busy Period, it sends the MSC_SETUP message without the WPS data.

In step 216, following the determination that the call should be processed normally and that WPS data has not been requested, the MSC proceeds to step 124. Similarly, in step 212, following the determination that the call should be released, the return code in the MSC_SETUP message is set to the value corresponding to the code for "Release" in step 132, and step 126 is then performed.

When the BS receives the MSC_SETUP message, depending on its content, the BS determines how to process the call. If the call is a public call and it is time to serve a public call, then the processing of the BS depends on it's current congestion state. If the congestion state is Green, then a connection is established for the call. If the state is yellow, then the connection is established for the call only if it is an emergency call; otherwise it is released. If the call is a public call and it is time to serve a WPS call, then the call may be released. If the call is a WPS call, it will be queued if the queue is not full.

When radio channels become available, the queued WPS calls are served in accordance with a predefined pattern (for example 1 WPS call followed by 3 public calls). In the Busy Period, a preconfigured ratio of connections for WPS calls to public calls is maintained. In one embodiment, for every WPS call for which a connection is established, there are three public calls for which connections are established. If there are no public calls needing a connection, but it is time to serve a public call and there is an available radio channel, the radio channel is "borrowed" for a WPS call. The number of times a radio channel is borrowed for WPS calls is stored in a variable Super Counter (SC). Every time a radio channel is "borrowed," the SC is incremented up to a certain maximum, for example, 10. After the SC reaches its maximum it is not incremented. Subsequently, every time it is time to serve a WPS call from the queue, but the queue is empty, a public call is served and the SC is decremented, signifying the "returning" of a radio channel to public calls.

When the SC reaches its maximum, the WPS calls are not served out of turn immediately when a radio channel becomes available. Instead, a variable Available Channel Timer (ACT) is associated with the available radio channel. If the timer expires before a public call arrives, a WPS call is served call from the queue. This allows some time for public call origination messages to be received. In one embodiment, the ACT is implemented as a timestamp associated with the available radio channel, which is compared to the current time, and when the difference exceeds a certain value, the ACT is considered expired. Other time monitoring mechanisms may however be used.

Also, when the SC reaches its maximum value, the value of N is not incremented. Not incrementing the value of N ensures that as soon as a public call arrives, the first available radio channel will be allocated to it. Not incrementing the value of N is accomplished by setting a Boolean variable Busy Period Inhibit to 1, and then setting it back to 0 after the steps in which N should have been incremented are bypassed.

Figure 3:
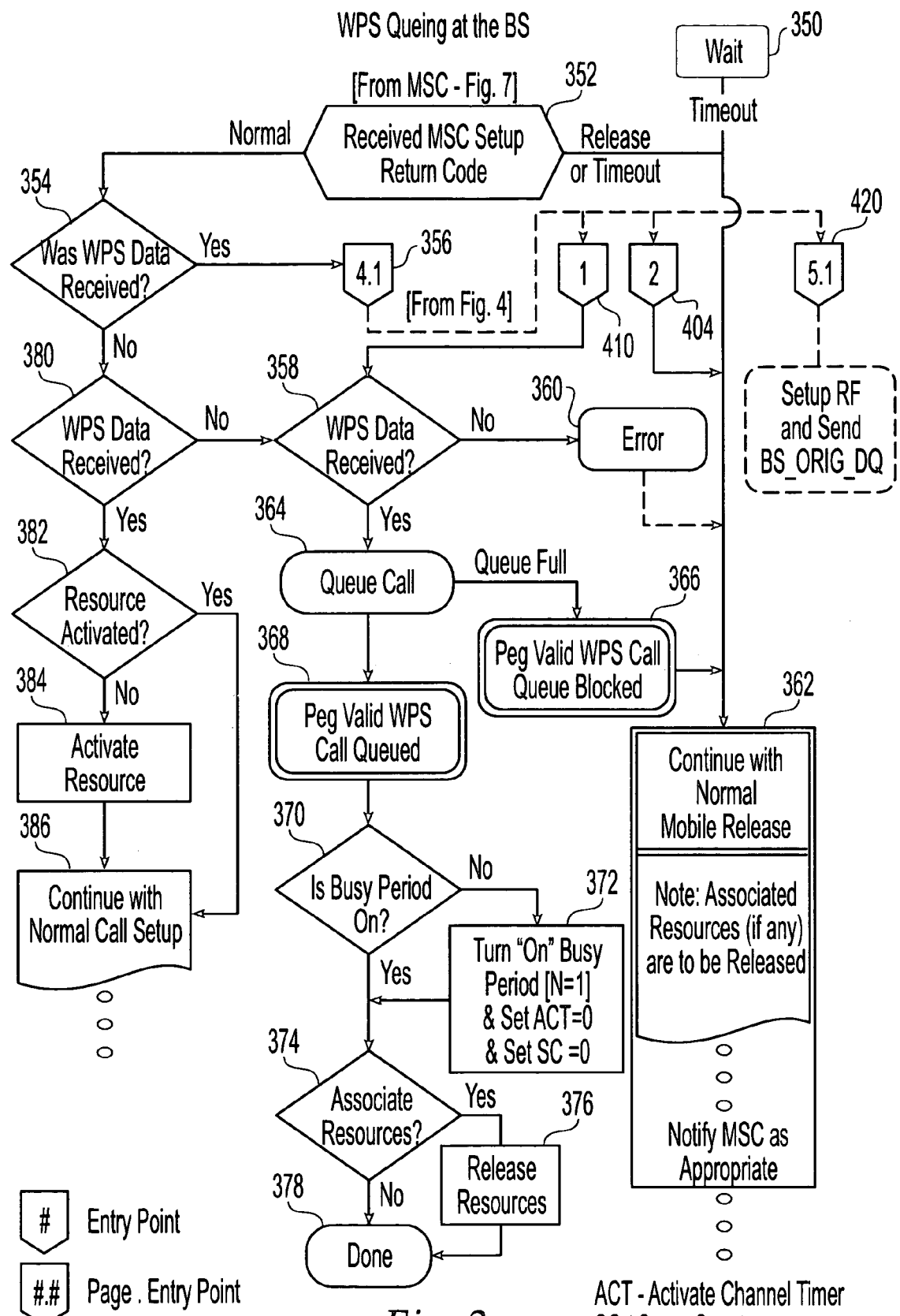

In FIG. 3, the BS receives the MSC_SETUP message sent by the MSC and processes the call according to the information in the MSC_SETUP message. In step 350, the BS waits for the MSC_SETUP message. If a preconfigured time has passed before the MSC_SETUP message is received then the call is released. If the MSC_SETUP message is received before the preconfigured time has passed, the BS looks up the value of the return code in the MSC_SETUP message in step 352. If the code has a value corresponding to "Normal," then in step 354, the BS checks whether the WPS data has been requested from the MSC for this call. If the WPS data has been requested, then the BS proceeds to step 356 in which the sequence of steps in FIG. 4 is executed.

Figure 4:
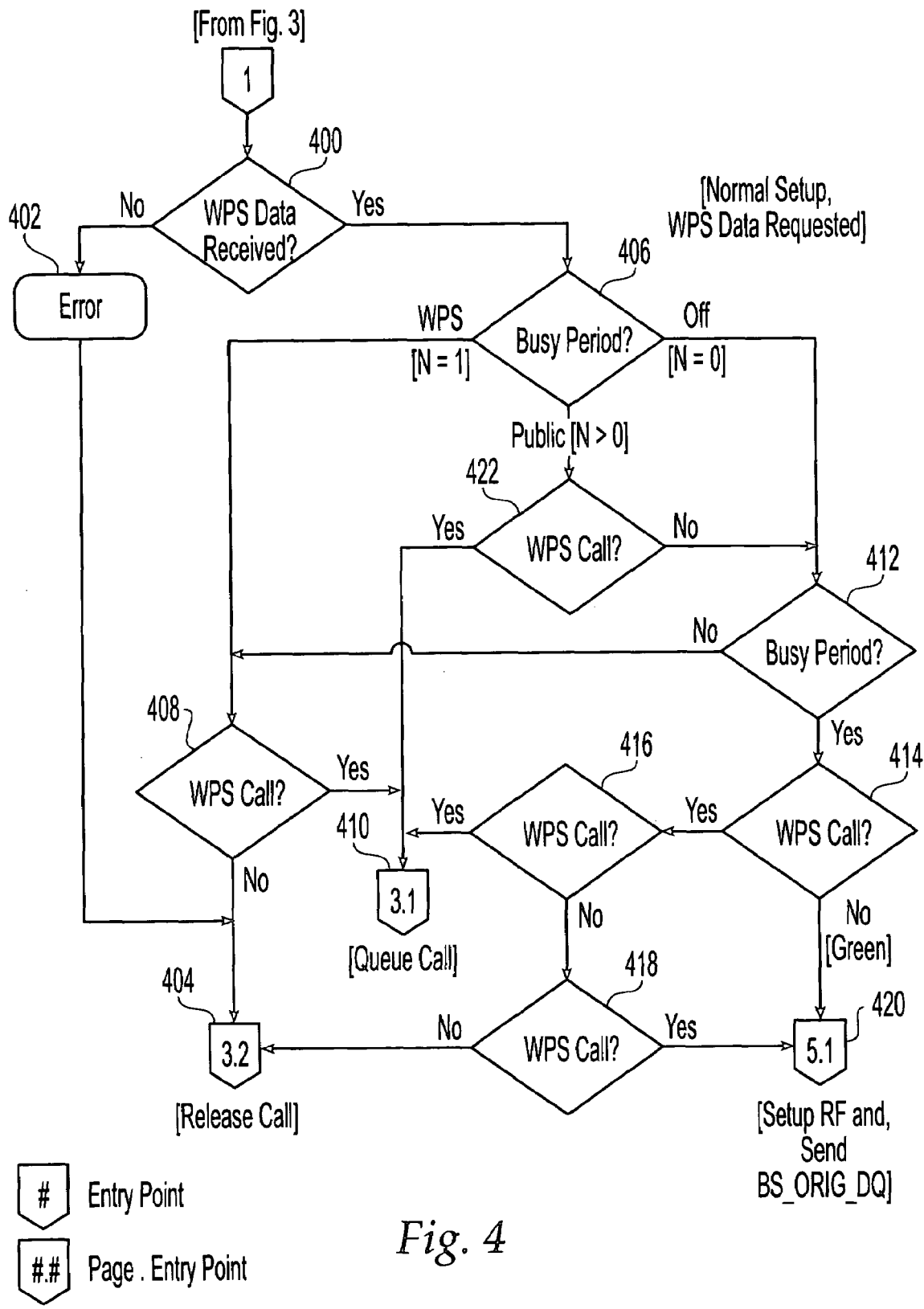

In FIG. 4 the BS performs operations required for the normal call setup when the WPS data has been requested by the BS. In step 400, the BS determines whether the WPS data has been received from the MSC. If it has not, then, in step 402, the BS concludes that an error has occurred, because BS specifically has requested the WPS data from the MSC, and then the BS releases the call in step 404. If, in step 400, the BS determines that WPS data has been received from the MSC it proceeds to step 406, in which it checks the value of N. If N is 1, meaning, the next call for which a connection is to be established is a WPS call, then in step 408, the BS determines if the currently processed call is a WPS call. If it is not, then the call is released in step 404. If in step 408 the BS determined that the call is a WPS call, then the call is queued in step 410.

If in step 406, the BS determines that the value of N is greater than 1, meaning that next call for which a connection is established is a Public call, then the BS proceeds to step 422, in which it determines whether the processed call is a WPS call. If it is, then it is queued in step 410. If it is not, then the BS determines, in step 412, if there is a radio channel available for that call. If the radio channel is not available, then the BS proceeds to step 408. If the radio channel is available, then the BS determines, in step 414, if the congestion state is Yellow. If it is, then the BS determines if the call is a WPS call in step 416. If it is a WPS call, then it is queued in step 410. If it is not a WPS call, then the BS determines if the call is an Emergency call in step 418. If it is not an Emergency call, then the BS proceeds to step 404. If it is an Emergency call, then the BS proceeds to step 420, in which resources are allocated to the call, and BS_ORIG_DQ message is sent to the MSC. If in step 406, the BS determines that the Busy Period is not on, then it proceeds to step 412.

Figure 5:
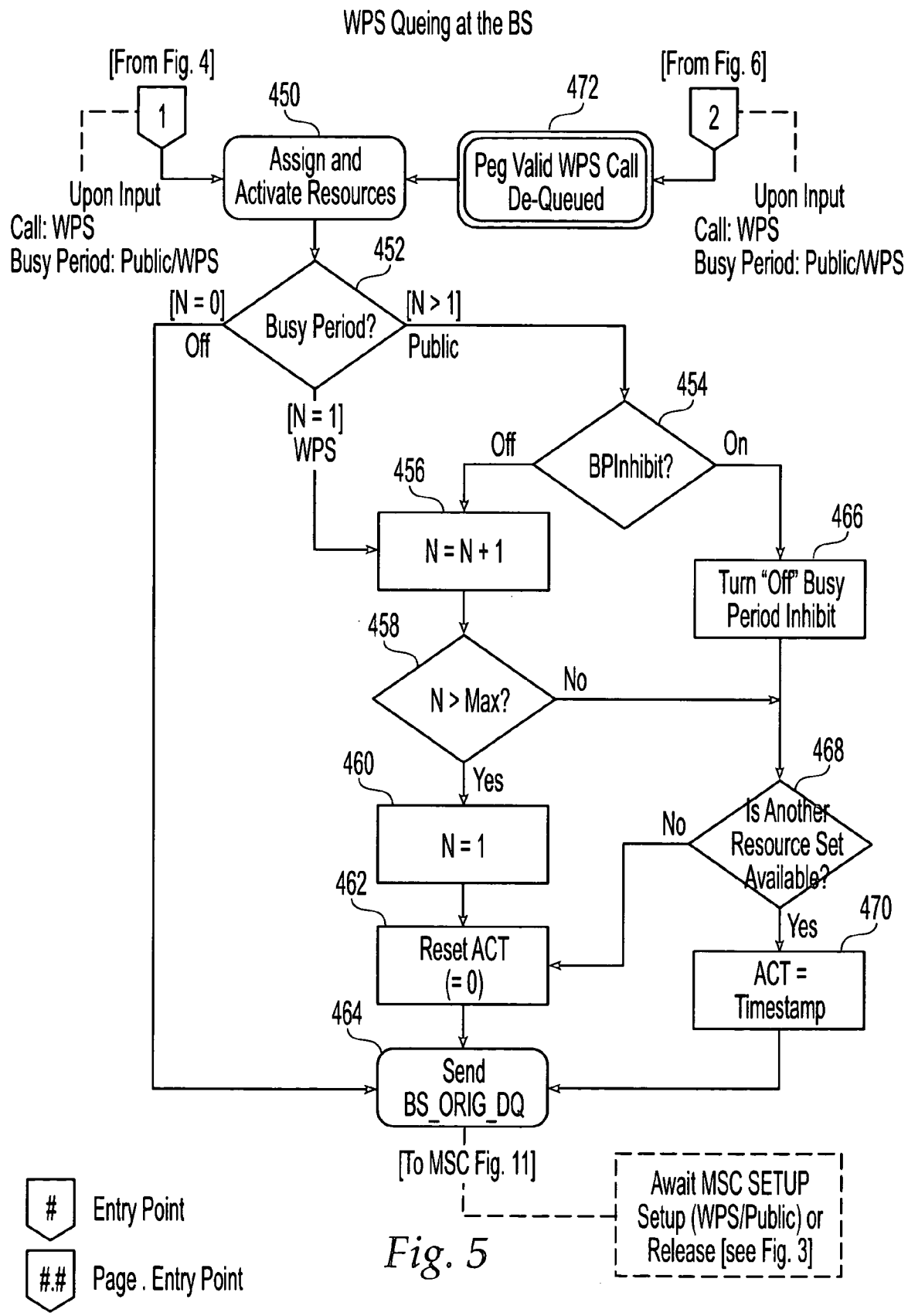

Step 420 in FIG. 4 is a sequence of steps illustrated in FIG. 5. There are at least two sets of circumstances under which the BS may execute the steps of the process illustrated in FIG. 5. The first set of conditions occurs when the BS reaches step 420 in FIG. 4. The second set of conditions occurs when there are queued WPS calls, and a radio channel becomes available. This second set of conditions is illustrated in FIG. 6.

In step 450, the BS assigns and activates a radio channel required for establishing a connection for the call. Then, the BS proceeds to step 452 in which it checks the value of N. If N is greater than 1, meaning that the next call served should be a public call, then the BS proceeds to step 454 in which it determines whether a Boolean parameter Busy Period Inhibit is set to 1. If Busy Period Inhibit is not set to 1, then N is incremented by 1 in step 456. Then, in step 458, the value of N is compared to the maximum allowed value. If N is greater then this maximum allowed value (such as 4 in one embodiment), then in step 460, N is set to 1, which indicates that a WPS call is to be served next. In step 462 ACT is set to 0. Then, in step 464, the BS sends BS_ORIG_DQ message to the MSC. If in step 454, Busy Period Inhibit is set to 1, it is set to 0 in step 466. Then, in step 468, the BS determines whether another radio channel is available. If another radio channel is not available then the BS proceeds to step 462, and if another resource is available, then the BS proceeds to step 470, in which ACT is set to the current time, followed by step 464.

If in step 452, the BS determines that the value of N is 1, meaning that a WPS call is to be served next, then it executes step 456. If in step 452, the BS determines that the value of N is 0, meaning that the Busy Period is off, then it executes step 464.

Figure 6:
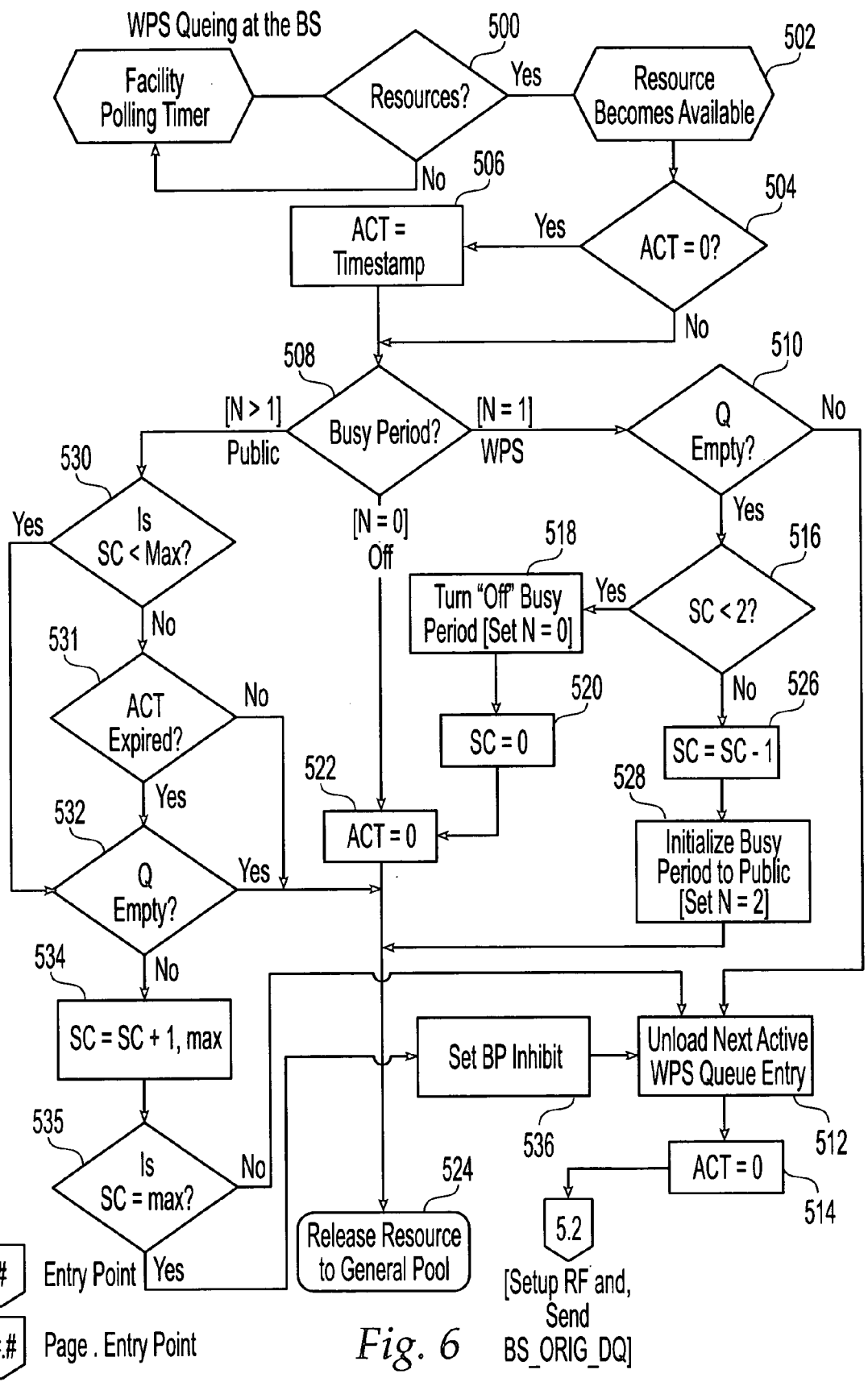

Also, the BS is constantly running a process illustrated in FIG. 6. In step 500, the BS checks whether a radio channel has become available, and if it has not, then it checks for a radio channel in a preconfigured time interval. When a radio channel becomes available in step 502, the BS checks the value of the ACT in step 504. If ACT is 0, then ACT is set to the current time in step 506. If ACT is not 0, then its value remains unchanged. In step 508 the BS determines the value of N. If N is 1, meaning that the next connection is supposed to be established for a WPS call, the BS proceeds to step 510, in which it determines if the queue is empty. If the queue is not empty, then the first call in the queue is unloaded from the queue in step 512, the ACT is set to 0 in step 514, valid WPS call de-queued variable is incremented in step 472 in FIG. 5 followed by step 450.

If in step 510 it is determined that the queue is empty, then the value of the SC is checked in step 516. If SC is equal to 0, meaning that no radio channels have been borrowed from public calls, or, alternatively, all borrowed radio channels have been returned, indicated by SC being equal to 1, the Busy Period is turned off in step 518, by setting N to 0. In step 520, SC is then set to 0. In step 522, ACT is set to 0, and then in step 524 the radio channel is released to general pool. If in step 516 it is determined that SC is greater than 1, then it is decremented by 1 in step 526. Then in step 528, N is set to 2, followed by step 524.

If, in step 508, N is greater than 1, meaning that a public call is served next, then in step 530, SC is compared to its maximum possible value. If SC is less than the maximum value, then the BS proceeds to step 532 in which the BS checks if the queue is empty. If the queue is not empty, then SC is incremented by 1 in step 534. In step 535 the BS determines whether the SC has reached its maximum value, meaning that the maximum allowed number of channels has been borrowed from public calls. If it has, then, in step 536, the Busy Period Inhibit is set to 1, followed by step 512, and if it has not, step 512 follows step 535. If, in step 532, the BS has determined that the queue is empty, then the BS proceeds to step 524. If, in step 530, the BS has determined that SC is less than the maximum possible value, then the BS checks if ACT has expired in step 531. If it has, then the BS proceeds to step 532, and if it has not than it proceeds to step 524. If in step 508, the BS has determined that the value of N is 0, meaning that the Busy Period is off, then it proceeds to step 522.

Turning back to FIG. 3, there are three options available to the BS with respect to the processed call: (1) the call may be queued if it is a WPS call, corresponding to step 410; (2) the call may be released, corresponding to step 404; or (3) a connection for the call may be established, corresponding to step 420.

The call is released if the MSC has determined that there is some error with the user profile validation or the processed call is a public non-Emergency call and the congestion state of the BS is not Green. The call is queued only if it is a WPS call, after the MSC processing illustrated in FIGS. 7, 8, 9, 10, and 11, if it has not been queued previously. A connection is established for the call if it has been unloaded from the WPS queue after the BS receives the second MSC_SETUP message in response to MS_ORIG_DQ, or the Busy Period was not on when the MS_ORIG message was sent.

In step 358, the BS checks if the call is a WPS call. If it is not, then the BS concludes that an error has occurred in step 360, and then releases the call and notifies the MSC as appropriate in step 362. If in step 358 the BS determines that the call is a WPS call, the BS attempts to queue the call in step 364. If the attempt is not successful, for example because the queue is full, then a counter of unsuccessful queuing attempts in incremented in step 366, followed by step 362. If the attempt to queue the call in step 364 is successful, then a counter of successful queuing attempts is incremented in step 368. Then in step 370, the BS checks if the Busy Period is on by checking the value of N. If N is 0, meaning that the Busy Period is off, then, in step 372, the Busy Period is turned on by setting N to 1, and ACT is set to 0, and SC is set to 0. In step 374, the BS checks if a radio channel is associated with the call and, if it is, then the channel is released in step 376, and the processing stops in step 378. If in step 374, the BS determines that there are no channels associated with the call, then the BS proceeds to step 378. If in step 370 the BS determines that N is greater than 0, meaning that the Busy Period is on, then the BS bypasses step 372 and proceeds to step 374.

If in step 354 the BS determines that the WPS data has not been requested from the MSC, then the BS proceeds to step 380, in which it checks whether the WPS data has been received from the MSC. If it has, then the BS proceeds to step 358. If it has not, then the BS proceeds to step 382, in which it checks if a radio channel is activated for this call. If it is not then in step 384 a radio channel is activated for this call, followed by step 386, in which the normal call setup occurs. If in step 382, the BS determines that the radio channel is activated, then it proceeds to step 386.

Turning to step 464 in FIG. 5, the BS removes a WPS call from the queue and sends BS_ORIG_DQ message to the MSC. The MSC receives and processes this message as illustrated in FIG. 13. In step 550, the MSC is waiting for the BS_ORIG_DQ message for the call which it has processed previously. If the BS_ORIG_DQ message is not received within a preconfigured time interval, then, in step 552, the return code is set to the value of "Release." In step 564, the MSC_SETUP message without the WPS data is created and sent to the BS. The call processing then continues when the BS receives the MSC_SETUP message in step 352 in FIG. 3, followed by step 362.

If the MSC does not time out in step 550, but receives the BS_ORIG_DQ message with the release code, then the MSC proceeds to step 554 in which the resources, such as memory, associated with the call are released.

If the MSC receives the BS_ORIG_DQ message with the setup code from the BS within the preconfigured time interval, then the MSC checks if there is a register associated with the call in step 556. If there is no register then the MSC concludes that an error has occurred in step 558. If there is a register, then the MSC determines if the call is a WPS call, a public call, or denied call, by executing the sequence of steps in FIG. 10 in step 560. If the call is a WPS call or a public call, then, in step 562, the return code is set to the value of "Normal," and, in step 564, the second MSC_SETUP message is created and sent to the BS. The BS receives the message in step 352 in FIG. 3, which is then followed by steps 354, 380, 382, 384, and 386.

If in step 560, the MSC determines that the call is a denied call, then the MSC proceeds to step 552. Also, turning back to FIG. 8, if there is glare, and the new call is released (step 152 in FIG. 8), the MSC performs step 552.

The invention described and claimed herein is not to be limited in scope by the exemplary embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

The present invention includes computer readable media (such as hard drives, CD-ROMs, network file systems) with instructions for causing a processor or system to perform the methods of this invention, special purpose integrated circuits designed to perform the methods of this invention, and the like.

We claim:

1. A method for establishing a connection for a wireless call over a radio channel in a radio spectrum, the method comprising:
   receiving a call origination message from a mobile device at a base station;
   creating a base station origination message comprising congestion state information for the base station, call type information, and a request for priority information for the wireless call, wherein the congestion state for the base station may be (a) that there are no available radio channels at the base station, (b) that the available resources are limited and if a call connection is established it may be subject to interference from other calls, or (c) that there are sufficient radio channels available to establish a connection for the wireless call, and wherein the call type information identifies the wireless call as a high-priority Wireless Priority Service (WPS) call or a low-priority public call;
   sending the base station origination message to a mobile switching center;
   receiving a first setup message comprising call treatment information and the requested priority information from the mobile switching center sent in response to the base station origination message; and
   processing the wireless call as a high-priority call or as a low-priority call according to the processing information in the setup message.

2. The method of claim 1 further comprising the step of placing the call on a queue if it is high-priority and no radio channels are available for establishing a connection.

3. The method of claim 2 further comprising the step of establishing a call connection on an available radio channel, wherein, if there are high-priority calls on the queue, the call connection is established in accordance with a predetermined pattern.

4. The method of claim 3 wherein the pattern is to establish connections for a first number of high-priority calls and then establish connections for a second number of low-priority calls.

5. The method of claim 4 wherein a connection for a high-priority call on the queue is established out of turn if a radio channel becomes available and there are no low-priority calls.

6. The method of claim 5 further comprising the steps of incrementing a counter if the connection is established, out of turn, for one of the high-priority calls on the queue; and
   decrementing the counter if the connection is established, out of turn, for a low-priority call, the counter has a value greater than 1, and there are no high-priority calls in the queue.

7. The method of claim 6 wherein the request for the priority information is included in the base station origination message based on whether the queue is empty and the value of the counter.

8. The method of claim 1 wherein the call type information in the origination message identifies the call as a high-priority call or a low-priority call and further comprising the steps of:
   placing the call on a queue if it is high-priority and no radio channels are available for establishing a connection;
   sending a dequeue message to the mobile switching center when the call is removed from the queue; and
   receiving a second setup message from the mobile switching center; and establishing the connection for the call.

9. A method for providing information necessary for establishing a connection for a wireless call over a radio channel in a radio spectrum, the method comprising:
- receiving from a base station a base station origination message comprising congestion state information, call type information, and a request for priority information for the wireless call, wherein the congestion state for the base station may be (a) that there are no available radio channels at the base station, (b) that the available resources are limited and if a call connection is established it may be subject to interference from other calls, or (c) that there are sufficient radio channels available to establish a connection for the wireless call, and wherein the call type information identifies the call as a high-priority Wireless Priority Service call or a low-priority public call;
- determining call treatment information based on the congestion state information and the call type information for the wireless call;
- creating a first setup message comprising call the treatment information and the requested priority information;
- determining whether the wireless call should be processed by the base station as a high-priority call or a low-priority call; and
- sending the first setup message to the base station.

10. The method of claim 9 further comprising the step of allocating memory for the wireless call when the base station origination message is received.

11. The method of claim 10 further comprising:
- checking if there is allocated memory for an older wireless call originated from the same mobile device as the wireless call;
- releasing memory allocated to the older wireless call if it is a high-priority call; and
- releasing memory allocated to the wireless call if the older wireless call is a low-priority call.

12. The method of claim 11 further comprising the steps of:
- verifying that a dialed number begins with a predefined pattern;
- checking in a locally stored subscriber profile whether a subscriber originating the wireless call can originate a high-priority call; and
- if there is no locally stored subscriber profile, checking in a remotely stored subscriber profile whether the subscriber originating the wireless call can originate a high-priority call.

13. The method of claim 11 further comprising the steps of:
- determining whether the wireless call is an emergency call;
- if the wireless call is not an emergency call, checking subscriber profile; and
- if the wireless call is an emergency call bypassing the step of checking the subscriber profile.

14. A system for establishing a connection for a wireless call over a radio channel in a radio spectrum, system comprising:
- a base station operative to:
- receive a call origination message from a mobile device;
- create a base station origination message comprising congestion state information for the base station, call type information, and a request for priority information for the wireless call, wherein the congestion state for the base station may be (a) that there are no available radio channels at the base station, (b) that the available resources are limited and if a call connection is established it may be subject to interference from other calls,or (c) that there are sufficient radio channels available to establish a connection for the wireless call, and wherein the call type information identifies the call as a high-priority Wireless Priority Service (WPS) call or a low-priority public call;
- send the base station origination message to a mobile switching center;
- wherein the mobile switching center is operative to:
- receive a first setup message comprising call treatment information and the requested priority information from the mobile switching center sent in response to the base station origination message; and
- process the wireless call as a high-priority call or as a low-priority call according to the processing information in the setup message.

15. A system for providing information necessary for establishing a connection for a wireless call over a radio channel in a radio spectrum, the system comprising:
- means for receiving from a base station a base station origination message comprising congestion state information for the base station and call type information for the wireless call, wherein the congestion state for the base station may be (a) that there are no available radio channels at the base station, (b) that the available resources are limited and if a call connection is established it may be subject to interference from other calls, or (c) that there are sufficient radio channels available to establish a connection for the wireless call, and wherein the call type information identifies the call as a high-priority Wireless Priority Service (WPS) call or a low-priority public call;
- means for determining call treatment information based on the congestion state information, the call type information for the wireless call, and a request for priority information for the wireless call;
- means for creating a first setup message comprising call the treatment information and the requested priority information; and
- means for sending the first setup message to the base station.

* * * * *